Jan. 19, 1926.   W. LEWIS   1,570,506
ATTACHMENT FOR ROLL OVER PATTERN DRAWING MOLDING MACHINES
Original Filed Nov. 12, 1923   4 Sheets-Sheet 2

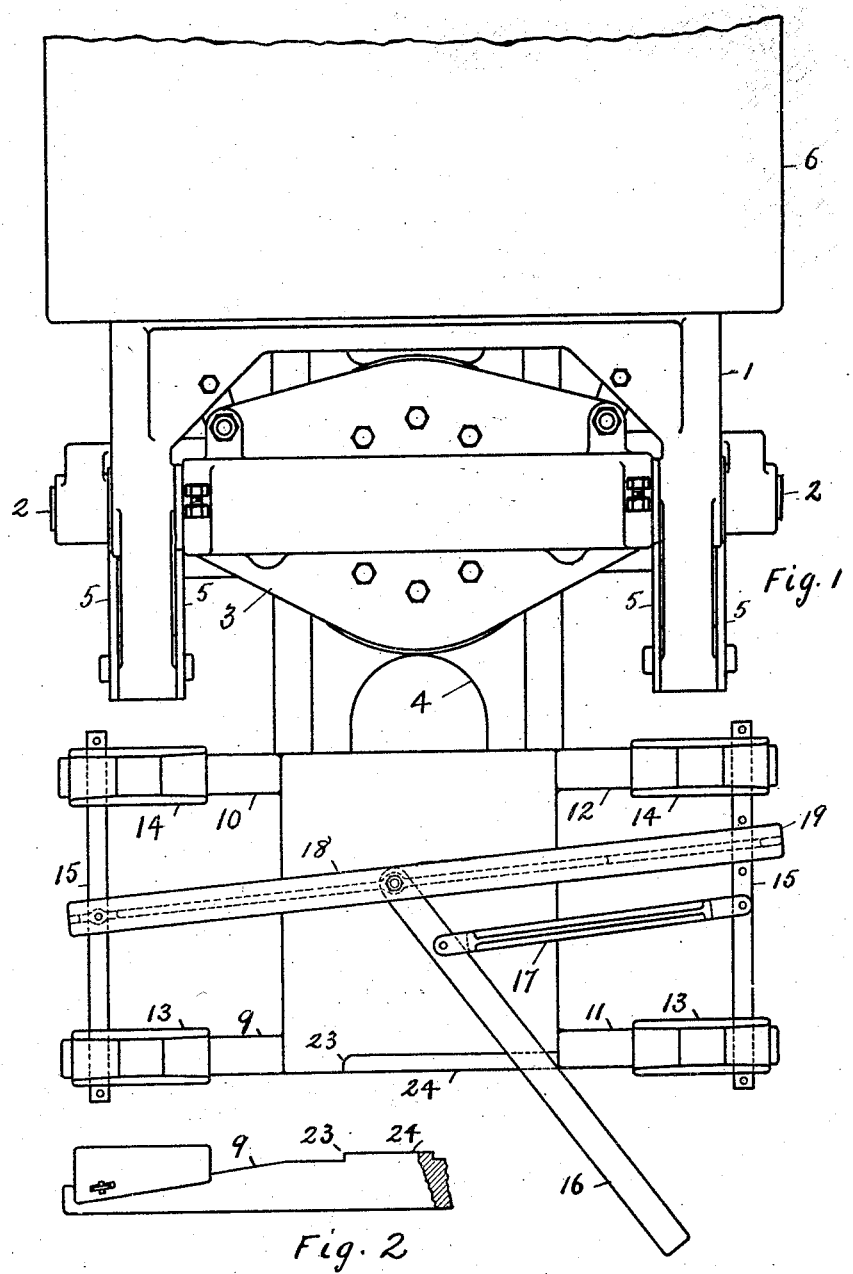

WITNESSES:

INVENTOR
Wilfred Lewis
BY
Augustus B Stoughton
ATTORNEY

Patented Jan. 19, 1926.

1,570,506

UNITED STATES PATENT OFFICE.

WILFRED LEWIS, OF HAVERFORD, PENNSYLVANIA.

ATTACHMENT FOR ROLL-OVER PATTERN-DRAWING MOLDING MACHINES.

Application filed November 12, 1923, Serial No. 674,184. Renewed October 22, 1925.

*To all whom it may concern:*

Be it known that I, WILFRED LEWIS, a citizen of the United States, residing at Haverford, in the county of Montgomery and State of Pennsylvania, have invented a new and useful Attachment for Roll-Over Pattern-Drawing Molding Machines, of which the following is a specification.

The principal object of the present invention is to make good molds, and this object is attained by relieving the machine of the effect of the unbalanced load, consisting of the flask and contents, prior to pattern-drawing and with the flask support properly equalized and secured.

To this and other ends hereinafter set forth the invention, generally stated, may be said to comprise an attachment for roll-over pattern-drawing molding machines comprising in combination a leveling mechanism adapted to receive the flask and contents and to operate in opposition to the weight thereof, and stop means for limiting the opposition of the leveling mechanism to the weight of the flask and contents, whereby and upon uncoupling, the roll-over mechanism is relieved of the weight of the flask and contents and of the effects of such release.

The invention will be claimed at the end hereof but will be first described in connection with the embodiments of it chosen for illustration in the accompanying drawings forming part hereof and in which Figure 1 is a top or plan view of parts of a pattern-drawing roll-over molding machine and of leveling mechanism having one embodiment of stop means and actuating appliances.

Fig. 2 is a detached elevational view of one of the wedge devices shown in Figure 1.

Figure 3:
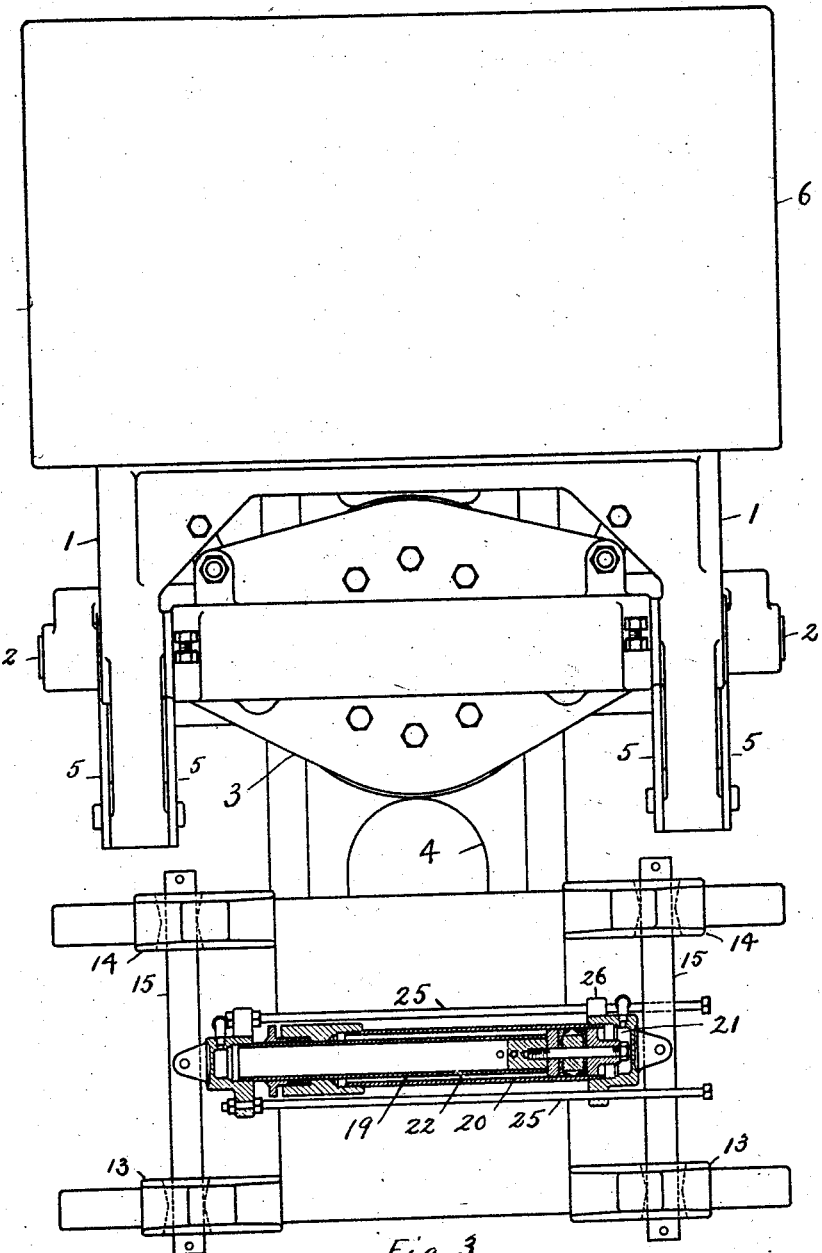
Fig. 3 is a view similar to Fig. 1, partly in section, illustrating a modification of the stop means and power appliances.

In the drawings 1 are the roll-over arms pivoted at 2 to a structure 3 afforded vertical motion in respect to the base 4. As shown the arms 1 are connected with the base 4 by a link 5. In use as the structure 3 rises the arms 1 rise and in doing so lift a flask A from the table 6, the arms being connected with the flask A and with its pattern plate, with the latter, for example, by means of the mechanism 7. As the structure 3 continues to rise the operation of the links 5 is to roll the arms over so that the flask and its contents depending from them is deposited on a support, generally indicated at 8. The flask is then uncoupled from the arms and pattern plate and the structure 3 again rising, lifts arms and the pattern plate, thus drawing the pattern from the flask which remains upon the support 8. It is customary to use a vibrator, which is too well understood to require further description or illustration, during the pattern-drawing operation. There is nothing particularly new set forth in the foregoing description which is given in connection with one of many types of roll-over pattern-drawing molding machines in order that my attachment, which is not limited to use in connection with any particular one of those types, may be explained.

Figure 4:
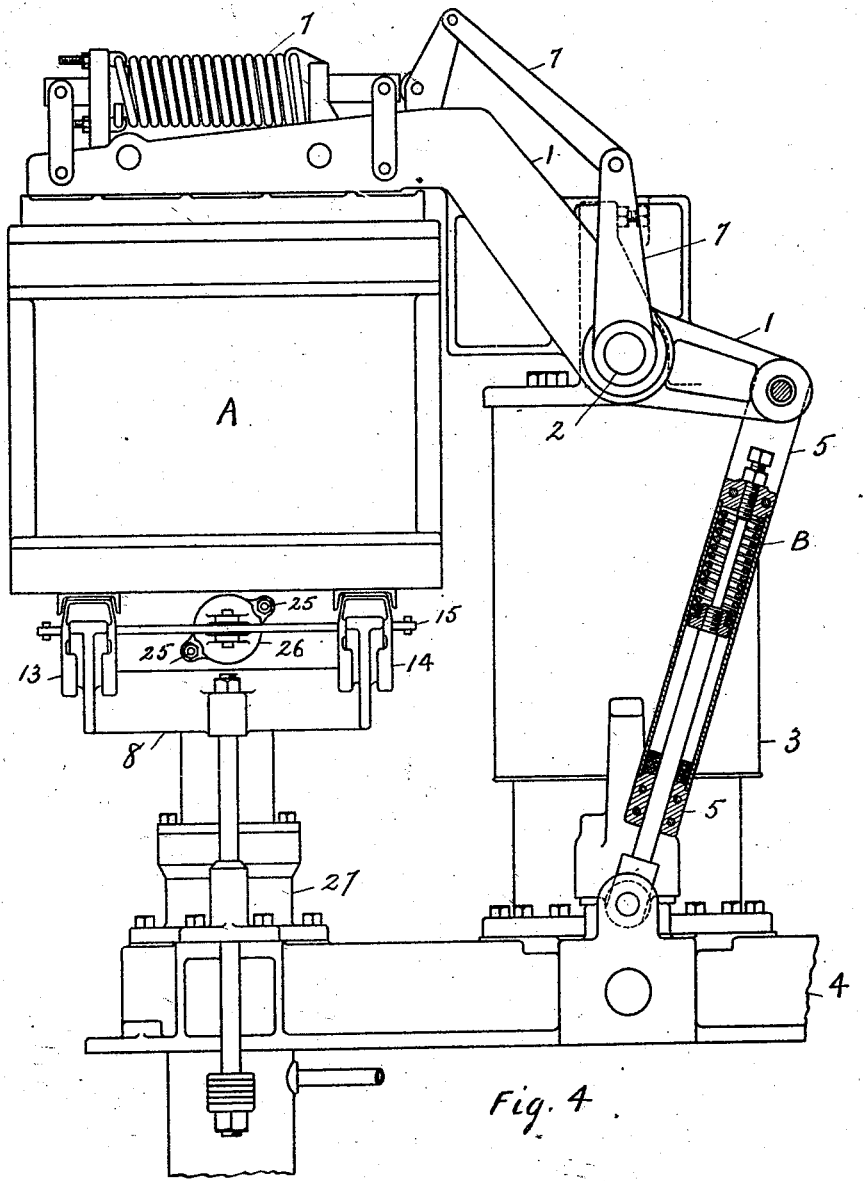
Figs. 4 and 5 are elevational views, partly in section, showing two positions of the roll-over mechanism and illustrating another modification of stop means for limiting the operation of the leveling mechanism.
Figure 5:
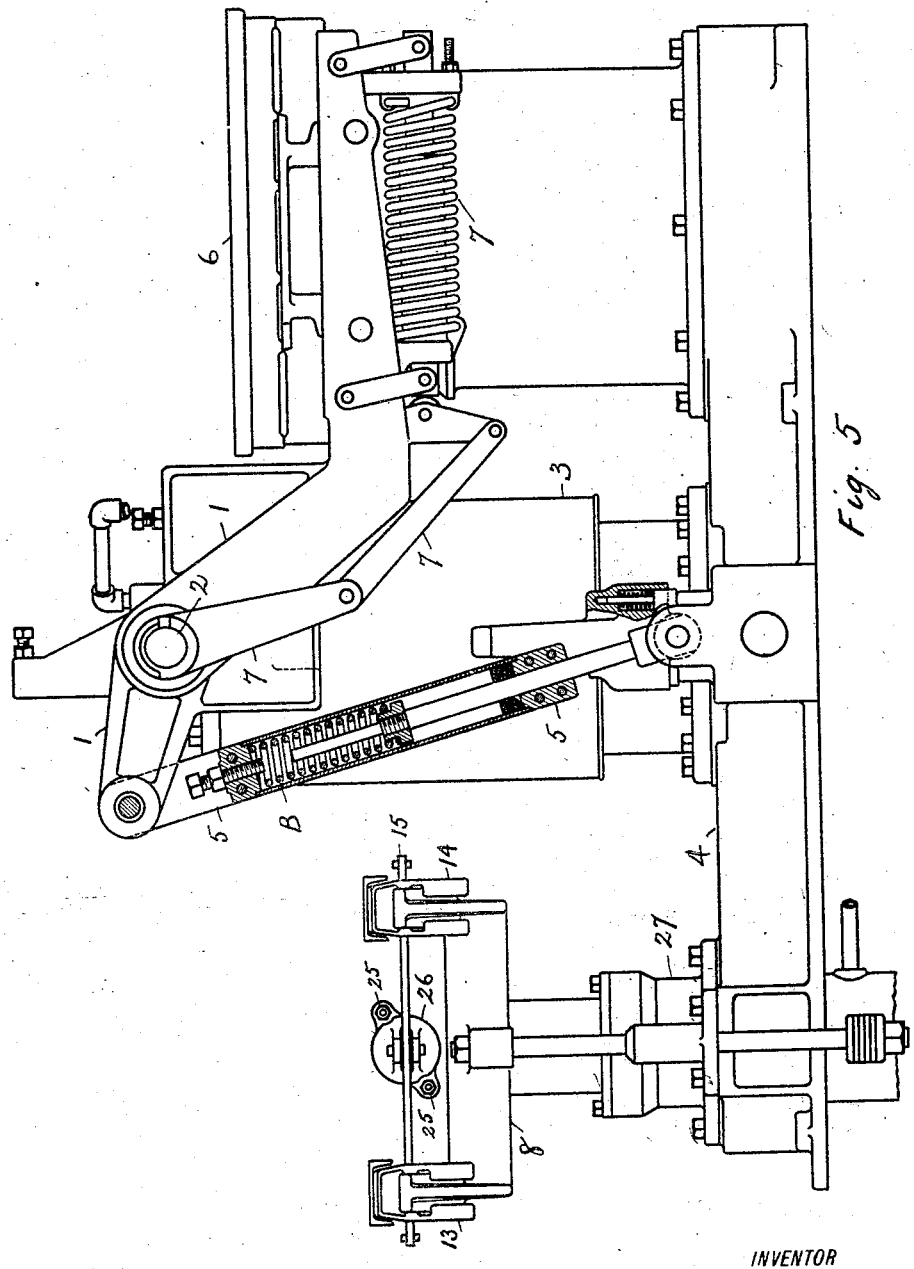

A description will now be given of leveling mechanism adapted to receive the flask and to operate in opposition to the weight thereof. On the support 8 are four inclined faces 9, 10, 11 and 12. Wedges 13 and 14 connected in pair by rods 15 ride on these inclined faces and the connection between the rods and wedges is such that the wedges may assume positions in which one wedge of a pair is nearer to the center of the support 8 than the other wedge of a pair. In this way inequalities in the bottom board of the flask are compensated for and the flask is engaged in proper position. As shown in Fig. 1, the rods 15 are each connected to a hand lever 16 by pivotal links 17 and 18, the link 18 being extended as at 19 to afford a guide. In the modification shown in Fig. 3, one element 19 of a differential piston and cylinder structure is connected with one rod 15, and the other element 20 of that structure is connected with the other rod 15. Air under pressure acting in the chamber 21, tends to separate the rods 15, and the constant admission of air under pressure in the chamber 22 tends to draw the rods 15 towards each other. Substantially the difference between the construction of Fig. 1 and the construction of Fig. 3 is that in the first case the wedges are operated by hand to lift when drawn toward each other, and in the second case by air pressure to lift when separated. Stop means for limiting the operation of the leveling mechanism to the weight of the flask and contents will now be described. Referring to Figs. 1 and 2, the shoulder 23 on the surface 24 upon which the lever 16 slides, operates as a stop in the sense that when the lever 16 drops past the shoulder 23 the operator releases the lever 16 having exerted upon it that amount of force which is necessary to balance the weight of the flask and the effect of its release from the arms 1 upon the machine. As shown in Fig. 3, the stop means comprise the headed rods 25 and the yoke 26, it being understood that in the structure shown in Fig. 3 the high parts of the inclines are remote from the support 8 and that the wedges are turned end for end in respect to the position shown in Fig. 2. As shown in Fig. 4, the stop means assume another modification in form. In that figure the leveling mechanism is mounted on a piston and cylinder structure 27 subjected to compressed air of which the pressure is limited in such a way that the weight of the flask and contents is balanced. Although in this construction the wedges may be brought to their limit of travel as fixed by the stop 23, Fig. 2, or 26, Fig. 3, in order to be sure that the operation of the vibrator may not loosen them, still no more than the weight of the flask and contents is taken because anything in excess of that overcoming the air pressure in the part 27, depresses the support 8.

In use the wedges first come to an even bearing on the bottom board of the flask and then lift until their action is restrained by the stop means, and this restraint is exercised when the unbalanced weight of the flask and contents has been taken from the arms 1, and in this connection it will be seen that no allowance need be made for the effect of relieving the arms and machine from the unbalanced weight of the flask and contents when the flask is uncoupled. The link 5 is shown as fitted with a spring which balances the weight of the moving parts with the exception of the flask and contents, and this unbalanced weight is by the described mechanism supported by the wedges or structure to which they are connected, thus when the flask is uncoupled from the arms relative movement is avoided with the result that the pattern can be drawn straight and a good mold produced. The described mechanism may not only take and support the exact weight of the flask and contents but may actually lift the structure 3, slightly, assisted by the supporting springs B, in the position shown in Fig. 4, thus avoiding any elastic recoil in the machine that might be caused by uncoupling the flask when its weight is taken from the arms.

It is evident in Fig. 1 that the lever 16 does not act with equal force and effect upon the cross bars 15 and that this inequality can be compensated when desired by using a slightly greater wedge angle on the rails where the force is greater, but ordinarily there is sufficient stiffness in the swinging frame to take care of this difference, and when an air cylinder is employed the action and reaction being equal on both cross bars 15, it is evident that the wedge angles should be equal and they are generally made so.

It will be obvious to those skilled in the art that modifications may be made in details of construction and arrangement and mere matters of form without departing from the spirit of the invention which is not limited to such matters or otherwise than the prior art and the appended claims may require.

I claim:

1. An attachment for roll-over pattern-drawing molding machines comprising in combination a leveling mechanism adapted to engage the flask and contents and to operate in opposition to the weight thereof and stops for limiting the opposition of the leveling mechanism to the weight of the flask and contents, whereby and upon uncoupling, the roll-over mechanism is relieved of the weight of the flask and contents and of the effect of such release.

2. At attachment for roll-over pattern-drawing molding machines comprising in combination complementary wedges adapted to engage the flask and contents, wedge actuating mechanism adapted to shift said wedges not only to contact with the flask but also to lift it, a stop for said wedge actuating mechanism limiting the movement of the wedges, and provisions for holding them in that position after taking the weight of the flask and contents.

3. An attachment for roll-over pattern-drawing molding machines comprising in combination complementary wedges adapted to receive the flask and contents, a lever linked to said wedges, and a shoulder co-operating with said lever as the stop.

4. A roll-over pattern-drawing molding machine provided with means for taking the weight of a flask and its contents to relieve the machine from unbalanced loading prior to pattern-drawing.

WILFRED LEWIS.